Patented Sept. 11, 1923.

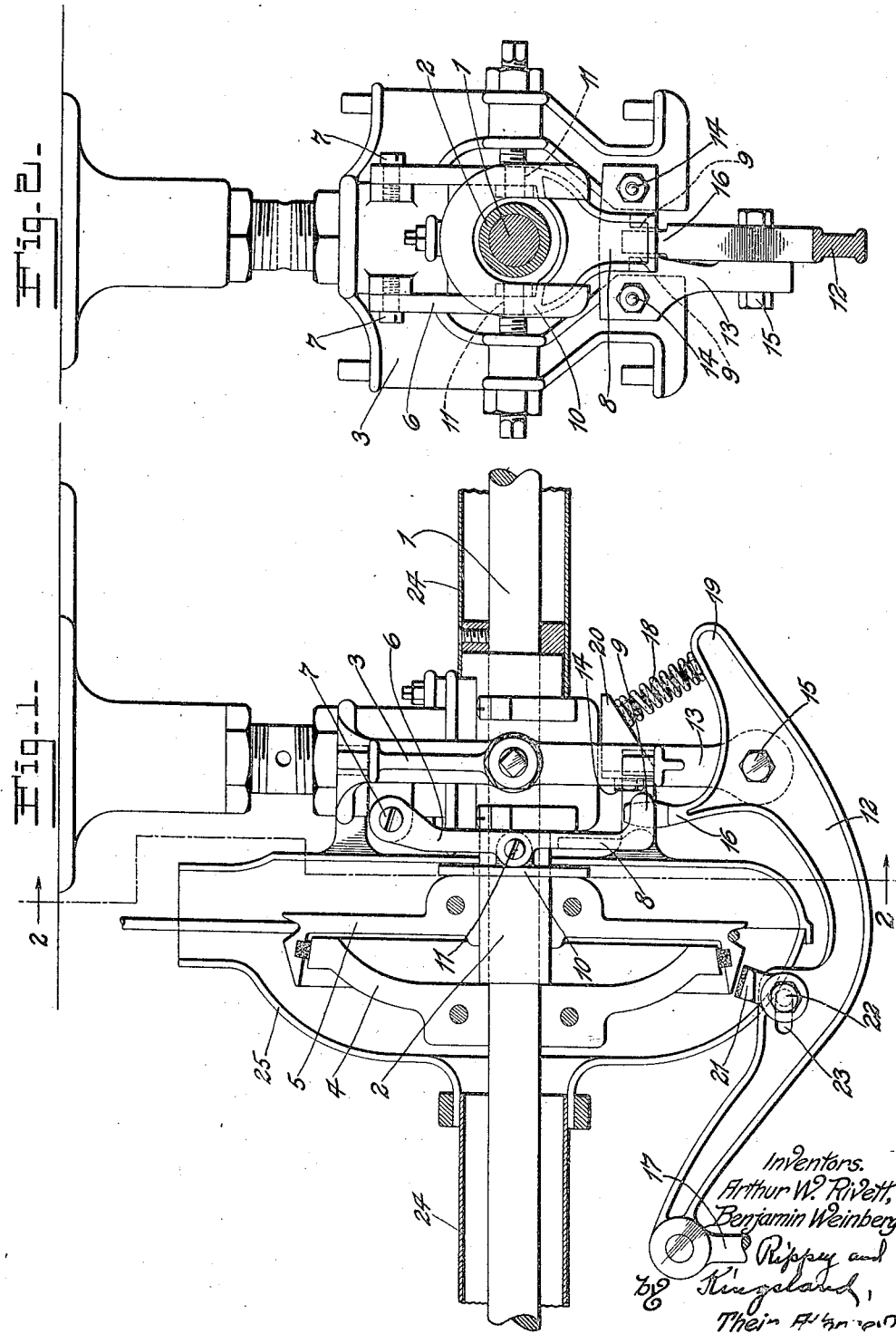

1,467,687

UNITED STATES PATENT OFFICE.

ARTHUR W. RIVETT AND BENJAMIN WEINBERGER, OF ST. LOUIS, MISSOURI, ASSIGNORS TO MARX & HAAS CLOTHING CO., OF ST. LOUIS, MISSOURI, A CORPORATION OF MISSOURI.

TRANSMISSION APPLIANCE.

Application filed January 29, 1923. Serial No. 615,764.

*To all whom it may concern:*

Be it known that we, ARTHUR W. RIVETT and BENJAMIN WEINBERGER, citizens of the United States, and residents of St. Louis, Missouri, have invented a new and useful Transmission Appliance, of which the following is a specification.

This invention relates to a transmission appliance, and has special reference to a transmission appliance for sewing machines and the clutch controlling connections thereof.

An object of the invention is to provide an improved transmission appliance having a clutch element supported upon a driving shaft and a transmission element mounted upon a non-rotative support, in combination with a novel and efficient device for moving the transmission element into engagement with the shaft supported clutch member.

Another object of the invention is to provide a device of the character stated having novel and efficient means for braking the transmission element and disengaging the same from the clutch member by which it is operated automatically and as an incident to the release of the device by which the transmission element is held in connection with the clutch member.

Other objects will appear from the following description reference being made to the drawing, in which—

Fig. 1 is a side elevation of the invention embodied in a transmission appliance for sewing machines.

Fig. 2 is a sectional view on the line 2—2 of Fig. 1.

As shown the power driven shaft 1 is supported in a bearing 2 mounted in a hanger bracket 3. A clutch member 4 is attached to and rotates with the shaft 1 while the transmission pulley 5 is mounted for rotary and sliding movements upon the bearing 2 and is movable into and out of clutching engagement with the clutch member 4.

A bifurcated lever 6 is supported by pivots 7 on the bracket 3. The bearing 2 is embraced between the arms of the lever 6. The lever 6 has a downwardly extended portion 8 below the bearing 2 and is provided with a pair of arms 9 on its lower end extending in a direction away from the pulley 5. An inverted U-shaped thrust member 10 bears against the hub of the pulley 5 and is pivotally connected with the lever 6 by pivots 11 so that when said lever is operated in one direction the pulley 6 will be moved into clutching engagement with the clutch member 4 and when the lever 6 is released the pulley 5 is free to become disengaged from the clutch member 4.

A lever 12 is supported in position so that when operated in one direction it will operate the lever 6 in a direction to move the pulley 5 into clutching engagement with the clutch member 4, and when operated in another direction will set the brake against the pulley 5 with pressure tending to disengage the pulley 6 from the clutch member 4 and to stop rotation of said pulley. A removable bracket 13 is attached to the hanger 3 below the shaft 1 by bolts 14, and the lever 12 is supported by a pivot 15 on the bracket 13. An arm 16 on the lever 12 extends between the arms 9 on the bifurcated lever 6 so that when the free end of the lever 12 is lowered the lever 6 will be operated in a direction to move the pulley 5 axially into clutching engagement with the clutch member 4. The lever 12 is provided with an operating connection 17 leading to a treadle, not shown, or other familiar operating device.

A spring 18 of the expansion type is mounted between an extended portion 19 of the lever 12 and an extended portion 20 of the bracket 13, and exerts its pressure or power to hold the lever 12 in a position in which the clutch is open, that is in which the pulley 5 is disengaged from the clutch member 4.

The brake shoe device 21 is supported by the lever 12 in position to engage the adjacent conical or tapering periphery of the pulley 5 when the spring 18 expands and releases the clutch. As will be seen by reference to Fig. 1 the tendency of the brake 21 is to disengage the pulley 5 from the clutch member 4.

In order to obtain accurate adjustment and to permit replacement of parts the brake 2 is secured to the lever 12 by a bolt 22 passing through a slot 23 in said lever. To cause the pulley 5 to be driven by the clutch member 4 the connection 17 is operated downwardly thereby operating the lever 12 to release the brake 21 from the inclined periphery of the pulley 5 to cause the arm 16 to operate the lever 6 thereby actuating the thrust member 10 and moving the pulley 5 axially along the bearings 2 and into engagement with the clutch member 4. This operation of the lever 12 is in opposition to the power of the spring 18. Upon release of the treadle or other device by which the connection 17 is operated to operate the lever 12, the spring 18 expands with the double result of releasing the pressure against the thrust member 10 in order to enable the pulley 5 to be released from the clutch member 4; and the setting of the brake 21 against the tapered periphery of the pulley 5 imparting pressure thereto in a direction tending to disengage said pulley from the clutch member 4, and to brake the pulley to stop it.

The rotary shaft 1 is enclosed within tubing 24 and the rotary clutch member 4 and the pulley 5 are enclosed within a case 25 composed of two matching parts, one of which is shown. In this way the mechanism may be safely operated without danger of injury to the operator because of the clothing becoming entangled with the operating parts, or otherwise.

What we claim and desire to secure by Letters Patent is:—

1. In a mechanism of the character described, a stationary bearing, a shaft journaled for rotation in said bearing, a clutch member attached to the shaft, a pulley mounted on said bearing for rotary and sliding movements, a pivoted lever, a thrust member between said lever and said pulley for moving said pulley into engagement with said clutch member, an additional lever for operating the first-named lever to move the pulley into engagement with the clutch member, a brake supported by said additional lever for engaging said pulley, and a spring for operating said second lever in a direction to release the first lever and to set the brake against the pulley.

2. In a mechanism of the character described, a stationary bearing, a shaft journaled for rotation in said bearing, a clutch member attached to the shaft, a pulley mounted on said bearing for rotary and sliding movements, a support for said bearing, a lever pivoted to said support, a thrust member between said lever and said pulley, a second lever carried by said support, and an arm on said second lever for moving the first lever in a direction to cause said thrust member to move the pulley into engagement with said clutch member.

3. In a mechanism of the character described, a stationary bearing, a shaft journaled for rotation in said bearing, a clutch member attached to the shaft, a pulley mounted on said bearing for rotary and sliding movements, a support for said bearing, a lever pivoted to said support, a thrust member between said lever and said pulley, a second lever carried by said support, an arm on said second lever for moving the first lever in a direction to cause said thrust member to move the pulley into engagement with said clutch member, and a brake supported by said second lever for engagement with said pulley when said second lever is in position to release said first lever.

4. In a mechanism of the character described, a stationary bearing, a shaft journaled for rotation in said bearing, a clutch member attached to the shaft, a pulley mounted on said bearing for rotary and sliding movements, a support for said bearing, a lever pivoted to said support, a thrust member between said lever and said pulley, a second lever carried by said support, an arm on said second lever for moving the first lever in a direction to cause said thrust member to move the pulley into engagement with said clutch member, a brake supported by said second lever for engagement with said pulley when said second lever is in position to reelase said first lever, and a spring for operating said second lever in a direction to release said first lever and to set said brake against said pulley.

5. In a mechanism of the character described, a stationary bearing, a shaft journaled for rotation in said bearing, a clutch member attached to the shaft, a pulley mounted on said bearing for rotary and sliding movements, a support in which said bearing is mounted, a bifurcated lever pivoted to said support and embracing said bearing between its arms, a thrust member between said lever and said pulley, a pivotal connection between said thrust member and said lever, a second lever carried by said support for operating said first lever in a direction to cause said thrust member to move said pulley into engagement with said clutch member, and a spring for operating said second lever in a direction to release said first lever.

6. In a mechanism of the character described, a stationary bearing, a shaft journaled for rotation in said bearing, a clutch member attached to the shaft, a pulley mounted on said bearing for rotary and sliding movements, a support in which said bearing is mounted, a bifurcated lever pivoted to said support and embracing said bearing between its arms, a thrust member between said lever and said pulley, a pivotal connection between said thrust member and said lever, a second lever carried by said support for operating said first lever in a direction to cause said thrust member to move said pulley into engagement with said clutch member, a spring for operating said second lever in a direction to release said first lever, and a brake carried by said second lever for braking said pulley when said first lever is released.

7. In a mechanism of the character described, a stationary bearing, a shaft journaled for rotation in said bearing, a clutch member attached to the shaft, a pulley mounted on said bearing for rotary and sliding movements, a support for said bearing, a bifurcated lever pivoted to said support and embracing said bearing between its arms, a thrust member between said lever and said pulley for moving said pulley into engagement with said clutch member, a bracket carried by said support, a lever pivoted on said bracket for moving said first lever in a direction to actuate said thrust member and thereby said pulley to move said pulley into engagement with said clutch member, and a spring mounted between said second lever and said bracket and exerting its power to move said second lever in a direction to release the first lever.

8. In a mechanism of the character described, a stationary bearing, a shaft journaled for rotation in said bearing, a clutch member attached to the shaft, a pulley mounted on said bearing for rotary and sliding movements, a support for said bearing, a bifurcated lever pivoted to said support and embracing said bearing between its arms, a thrust member between said lever and said pulley for moving said pulley into engagement with said clutch member, a bracket carried by said support, a lever pivoted on said bracket for moving said first lever in a direction to actuate said thrust member and thereby said pulley to move said pulley into engagement with said clutch member, a spring mounted between said second lever and said bracket and exerting its power to move said second lever in a direction to release the first lever, and a bracket supported by the second lever and arranged to engage said pulley when said spring actuates said second lever to release the first lever.

ARTHUR W. RIVETT.
BENJAMIN WEINBERGER.